US005355525A

United States Patent [19]

Lindmayer et al.

[11] Patent Number: 5,355,525

[45] Date of Patent: Oct. 11, 1994

[54] METHOD FOR OPERATING A HAND-HELD TRANSMITTER FOR CONTROLLING VEHICLE FUNCTIONS

[75] Inventors: Martin Lindmayer, Leonberg; Jürgen Moczygemba, Lichtenstein, both of Fed. Rep. of Germany

[73] Assignee: Mercedes-Benz AG, Fed. Rep. of Germany

[21] Appl. No.: 913,064

[22] Filed: Jul. 14, 1992

[30] Foreign Application Priority Data

Jul. 20, 1991 [DE] Fed. Rep. of Germany ....... 4124181

[51] Int. Cl.[5] ................................................ H04B 1/04

[52] U.S. Cl. ...................................... 455/99; 455/100; 455/127; 340/825.69

[58] Field of Search .................... 455/38.2, 92, 95, 99, 455/100, 127; 340/539, 696, 825.57, 825.62, 825.64, 825.69, 825.72, 825.76, 825.77; 359/142, 147, 148; 70/256; 307/10.2, 10.3; 361/172

[56] References Cited

U.S. PATENT DOCUMENTS

| | | | |
|---|---|---|---|
| 4,264,896 | 4/1981 | Sakarya et al. | 340/825.62 X |
| 4,973,958 | 11/1990 | Hirano et al. | 340/825.69 |
| 5,109,221 | 4/1992 | Lambropoulos et al. | 340/825.69 |

FOREIGN PATENT DOCUMENTS

| | | |
|---|---|---|
| 3341900 | 5/1985 | Fed. Rep. of Germany . |
| 3546490 | 12/1986 | Fed. Rep. of Germany . |
| 3806130 | 5/1989 | Fed. Rep. of Germany . |
| 9004042.2 | 9/1990 | Fed. Rep. of Germany . |
| 9102747.0 | 7/1991 | Fed. Rep. of Germany . |

*Primary Examiner*—Reinhard J. Eisenzopf
*Assistant Examiner*—Chi Pham
*Attorney, Agent, or Firm*—Evenson, McKeown, Edwards & Lenahan

[57] ABSTRACT

The present invention provides a method of operating a hand-held transmitter for controlling vehicle functions. The hand-held transmitter has the ability to emit output signals for controlling both locking devices and drives for closing vehicle openings. A hand-held transmitter emits the output signals for controlling locking devices at a first output power and range and emits output signals for controlling the drives at a second output power and range. The second output power and range are lower than the first output power and range.

9 Claims, 2 Drawing Sheets

METHOD FOR OPERATING A HAND-HELD TRANSMITTER FOR CONTROLLING VEHICLE FUNCTIONS

BACKGROUND AND SUMMARY OF THE INVENTION

The present invention relates to a method for operating a hand-held transmitter for controlling vehicle functions, this hand-held transmitter being capable of emitting output signals for controlling both locking devices and drives for closing vehicle openings.

An infrared hand-held transmitter which is supplied for remote control of functions in vehicles manufactured by Mercedes-Benz is known. The output signals which can be emitted by this hand-held transmitter essentially comprise a code section and a maintenance section. Using the code section, a relatively short coded information item is transmitted in a known manner from the transmitter to a receiver fixed to the vehicle, which allows, for example, a central locking system to be activated in the sense of unlocking and locking, even at a relatively long range from the vehicle. The maintenance section, which also permits windows which are still open after leaving the vehicle and the sliding roof to be closed by means of their electrical drives in vehicles which are fitted with a convenience closing device, is emitted only and for as long as the transmitting key of the hand-held transmitter is held without interruption for longer than a predetermined time interval directly subsequent to the emission of the locking code signal, that is to say only for the desired duration of the window or sliding roof closing movement. For safety reasons, the closing movement does not begin until a specific time interval has elapsed, for example 0.25 seconds after the start, or after the receipt at the vehicle end, of the maintenance signal, in the same way as the necessary holding of the transmitting key already represents a safety measure.

In the simplest case, the maintenance section of output signals consists of repeated clock pulses which are transmitted at constant intervals at an intensity different from that of the code signal or with an unchanged signal level. The output power of the hand-held transmitter and its range thus remains the same (cf. FIG. 2).

In view of increased efforts relating to the operating reliability of vehicles, especially also those having such convenience closing systems, it is desirable to permit the operation of the systems by means of a remote control hand-held transmitter only within a relatively small spatial region around the vehicle.

The present invention achieves this by providing a method of operating a hand-held transmitter for controlling vehicle functions, in which the hand-held transmitter has the ability to emit output signals for controlling both locking devices and drives for closing vehicle openings. In this method, the hand-held transmitter emits the output signals for controlling locking devices at a first output power and range and emits the output signals for controlling the drives at a second output power and range. The second output power and range are lower than the first output power and range.

With the present invention, it is immaterial, for example, whether the output signal is activated in order to control the convenience closing drives, for example via a dedicated key on the hand-held transmitter, subsequent to a previous operation of a code signal transmitting key or whether only a single transmitting key is provided. In the first case, the output power which can be received is determined simply by the selection of the key.

A hand-held transmitter is known from German Patent Document DE 38 06 130 Al, whose output power is variable as a function of the intensity of the ambient lighting.

In an embodiment of the present invention, the output power which can be received from the hand-held transmitter, and hence its range, are automatically reduced during the sequence of the successive output signals which can be activated by a single conventional transmitting key.

In an embodiment of the present invention, the electrical output power of a signal source is reduced in one step by the upstream connection of a resistor, which forms an electrical filter.

In another embodiment of the invention, two signal sources are provided side-by-side in the same hand-held transmitter, one of which can emit at full power, unfiltered and unattenuated, the other of which can emit only through a filter which is always connected upstream, or at reduced power. In this embodiment, a changeover switch, which can be controlled automatically, for example as a function of time, is required in order to change over from the one signal source to the other in order to reduce the output power which can be received.

In another embodiment, two signal sources are implemented in that these sources are activated jointly for a large range and one of them is switched off to reduce the range.

Finally in another embodiment of the invention, a dialogue control of the output power which can be received from the hand-held transmitter is provided as a function of a long-range changeover signal which is emitted by the vehicle itself after complete reception of a matching code signal and can be received and evaluated in the hand-held transmitter.

If required, suitable, variable signal filtering is also provided, for example by switching on a suitable filter, which is selected depending on the type of signal carrier (infrared, ultrasound, radio), in front of the signal output during the emission of the output signals which control the drives.

Other objects, advantages and novel features of the present invention will become apparent from the following detailed description of the invention when considered in conjunction with the accompanying drawings.

DETAILED DESCRIPTION OF THE DRAWINGS

Figure 1:
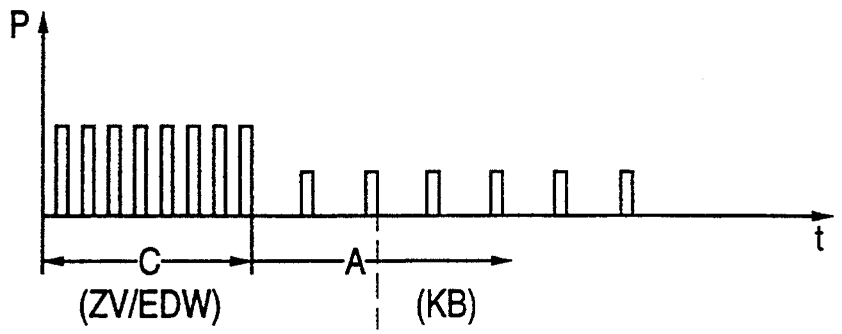
FIG. 1 illustrates a signal response of a hand-held transmitter over the operating time duration of its transmitting key according to an embodiment of the method of the present invention.
Figure 2:
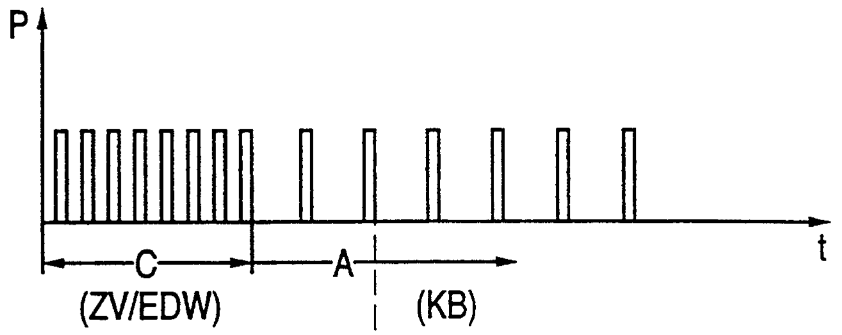
FIG. 2 PRIOR ART
FIG. 2 shows a corresponding signal response according to the prior art.

In both the diagrams according to FIGS. 1 and 2 the output transmitting power p which can be received from a hand-held transmitter—which corresponds to its range—with uninterrupted operation of a transmitting key is shown in a highly schematic form over a time axis t.

The signal pattern begins with the start of an actuation of the transmitting (emitter) key of the hand-held transmitter. The abbreviation ZV/EDW relates to locking apparatus or actuators of a central locking system/burglar alarm system (CLS/BAS). The abbreviation KB relates to drives of a convenience closing device (CCD).

From FIG. 2, showing a known signal pattern, the amplitudes P of the respective pulses of the code section C (control of the vehicle functions ZV/EDW) and of the maintenance section A (control of the vehicle function KB), that follows the code section, are equal. A dashed vertical line below the time axis in the range of the maintenance section A symbolizes that the control of the drives of the convenience closing device XB is only possible with a small delay with regard to the actual beginning of the maintenance section.

Accordingly, with a transmitter having two distinct emitter keys for the transmission of the different signal types or sections C and A, the selection of the key would not influence amplitude and range.

In the signals according to the method of the present invention shown in FIG. 1, however, amplitude of the pulses of the maintenance section is clearly diminished, by about 50 percent, with respect to the amplitude of the code section C pulses. Thereby, the receivable output power of the hand-held transmitter and its range when controlling the convenience function (KB) are clearly reduced compared to its relatively larger range for the control of the locking (ZV) and the anti-theft (EDW) functions. With a transmitter having two distinct emitter keys, use of the key for the signal type C would make the full output power available, while with the key for signal type A only the reduced output power would be available.

It is understood that other methods for influencing and reducing the actual output power can also be used in the context of the invention, for example a pulse-width control.

Figure 3:
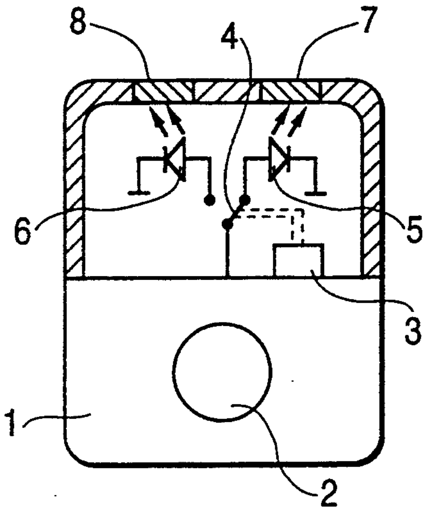
FIG. 3 shows a hand-held transmitter having two signal sources which can be switched on alternately, by means of a controllable switching element, in order to emit signals.

FIG. 3 shows a partially cut-away view of a hand-held transmitter 1 for infrared beams, which can be activated manually via a single transmitting key 2. In addition to the normal storage, coding and power supply means, which are not shown, the transmitter 1 comprises a switching element 3, which can be controlled automatically and has a changeover contact 4. It also has, as a signal source, a first infrared transmitting diode 5 and a second infrared transmitting diode 6, which can be driven alternately via the changeover contact 4. The first infrared transmitting diode 5 is arranged behind a transparent cover 7 in the housing of the hand-held transmitter 1, this cover not significantly reducing or attenuating the transmitted (optical) power which can be transmitted by the transmitting diode 5 and can be received by a receiver arranged downstream from it.

In contrast, the second infrared transmitting diode 6 is arranged behind a cover 8 which is likewise transparent but absorbs a part of the transmitted power.

In consequence, despite the identical design and power consumption of the two signal sources or transmitting diodes 5 and 6, the transmitted power radiated by the transmitting diode 6 can be received only in an attenuated manner by a receiver arranged downstream.

The switching element 3, which can be controlled automatically, changes its changeover contact over to the transmitting diode 6 precisely when it is intended to emit the reduced power/range maintenance signal, after emitting the code signal or section marked C in FIG. 1.

This process can be controlled by the program operating sequence of the hand-held transmitter by software, or even purely as a function of time via a timing device (timer, clock). This can be done since, in the case of the transmitter of the present invention, the time duration of the code signal to be emitted, and hence the time interval between the start of operation of the transmitting key 2 and the time of the range changeover, is always constant.

Figure 4:
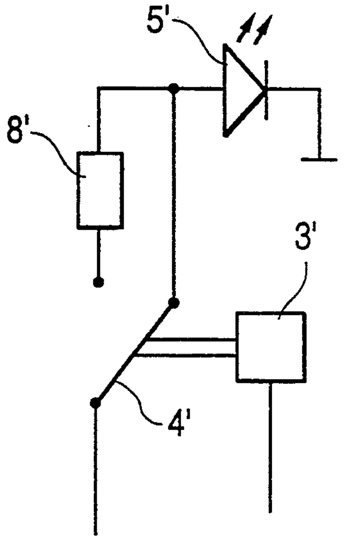
FIG. 4 is a schematic diagram of an infrared signal source, upstream of which a power-reducing resistor is connectable by a controllable switching element.

The same applies for a switching element 3', which can be controlled automatically, according to FIG. 4, which connects a biasing resistor 8' upstream of a single transmitting diode 5' of a hand-held transmitter, which is not shown in more detail, by means of a changeover contact 4'. The biasing resistor 8' limits the power consumption of the transmitting diode 5' in comparison with the basic position shown, and the biasing resistor 8' can thus likewise be regarded as a filter for the output power which can be received.

In an analogous manner to this embodiment, another embodiment of the invention provides two transmitting diodes 5 and 6 as in FIG. 3, but leaving these unfiltered transmitting diodes 5 and 6. Normally, when transmitting the code section, these two diodes 5 and 6 emit jointly. In order to reduce the output power which can be received, one of these diodes 5 or 6 is switched off by means of the switching element, which can be controlled automatically. As a consequence, the power consumption of the complete signal source and its range are also reduced. The switching arrangement to accomplish this is within the skill of one of ordinary skill in the art.

Figure 5:
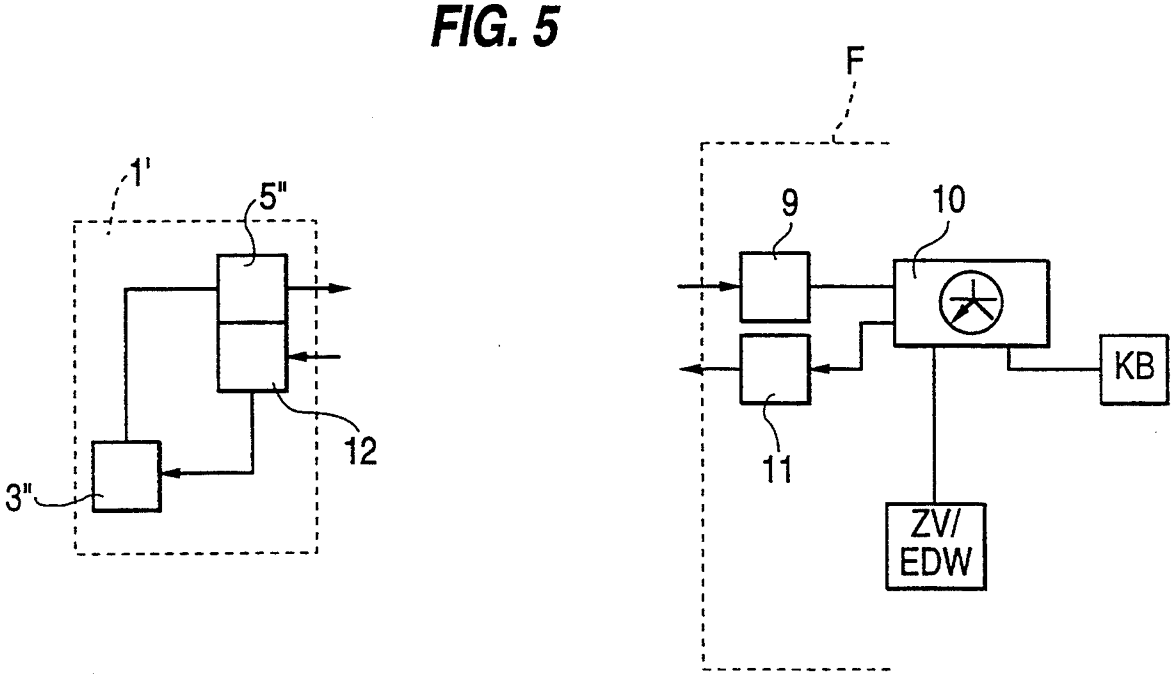
FIG. 5 is a schematic drawing of a dialogue (communication) system, in which the output power which is received from a hand-held transmitter (transponder) can be controlled to communicate with a transmitter (transponder) fixed to the vehicle.

Finally, FIG. 5 shows another embodiment, in a greatly simplified form, in which a switching element 3'', which can be controlled automatically, of a hand-held transmitter 1', such as shown in FIGS. 3 and 4, can be activated to communicate with a long-range transmitter fixed to the vehicle.

A vehicle F is partially indicated here only has a frame in dashed lines. Arranged within this vehicle F is a receiver 9, which is fixed to the vehicle F, having a control unit 10 connected downstream and a transmitter 11 which can be controlled by the control unit 10. In addition, the control unit 10 carries out the ZV/EDW and KB vehicle functions, which have already been mentioned a number of times, as indicated schematically here, by functional blocks. A hand-held transmitter 1', indicated on the left next to the vehicle F, comprises a signal source 5'', whose output power which can be received is variable in a suitable manner as explained above via the switching element 3''. The switching element 3'' is automatically controllable to operate in the sequence of FIG. 1. In addition to the signal source 5'', a receiver 12 is also provided in the hand-held transmitter 1'. This receiver 12 receives the signals which can be emitted by the transmitter 11 fixed to the vehicle F.

The embodiment of FIG. 5 is operated such that, upon activation of the hand-held transmitter 1' by means of its transmitting key, not shown here, the signal source 5'' emits a code signal to the receiver 9 which is fixed to the vehicle F. This code signal is decoded in the control unit 10 in the normal manner and is converted into a control command directed at the function ZV/EDW. At the same time, once the code signal, which must, of course, match the code stored at the vehicle end, has been received completely, the control unit 10 activates the transmitter 11 which is fixed to the vehicle F. The signal of the transmitter 11, which is emitted with a long range, is received by the receiver 12 of the hand-held transmitter 1'. The hand-held transmitter 1' thereupon activates the switching element 3'' for the time duration that the transmitting key is operated. This then reduces the output power which can be received from the signal source 5'', and hence its range, in the manner already discussed.

In this arrangement, both the hand-held transmitter 1' and the transmitter-receiver combination in the vehicle F have a transponder function.

It is understood that the exemplary embodiments shown can also be designed with transmission media other than infrared waves, without departing from the spirit and scope of the invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method of operating a hand-held transmitter for controlling vehicle functions, the hand-held transmitter having the ability to emit output signals for controlling both locking devices and drives for closing vehicle openings, comprising:

emitting the output signals for controlling the locking devices at a first output power and range; and emitting the output signals for controlling the drives at a second output power and range, the second output power and range being lower than the first output power and range.

2. Method according to claim 1, further comprising operating continuously a transmitting key of the hand-held transmitter to cause the hand-held transmitter to emit contiguous output signals, the output signals comprising a leading code section of limited time duration for controlling the locking devices, and a subsequent maintenance section for controlling the drives, and automatically switching by switching means the output power of the hand-held transmitter from the first output power to the second output power once the code section has been emitted.

3. Method according to claim 2, wherein the amplitude of pulses in the maintenance section is reduced compared with the amplitude of pulses in the code section.

4. Method according to claim 2, wherein the power consumption of a signal source, and its output power which can be received, is reduced once the code section has been emitted.

5. Method according to claim 2, wherein once the code section has been emitted, a change-over is made by a switching element, which can be controlled automatically, from a first signal source of the hand-held transmitter to a second signal source of the hand-held transmitter to reduce the output power which can be received.

6. Method according to claim 5, wherein the output power which is receivable from the hand-held transmitter is controlled through communication with a transmitter fixed to the vehicle, and once the output signals for controlling the locking devices have been received at the vehicle, the transmitter which is fixed to the vehicle emits a long-range changeover signal, which is receivable by the hand-held transmitter, which has a receiver, is evaluated by a changeover device of the hand-held transmitter and is automatically controllable, to temporarily reduce the transmitted output power which can be received from the hand-held transmitter.

7. Method according to claim 2, further comprising during the emission of the output signals controlling the drives, switching on a filter that is dependent on the type of signal carrier.

8. An arrangement for remotely controlling locking devices and drives for closing vehicle openings of a vehicle, comprising:

a control unit on said vehicle responsive to received commands to operate the locking devices and the drives; and a hand-held transmitter unit which emits output signals for controlling the locking devices at a first output power and range, and output signals for controlling the drives at a second output power and range that is lower than the first output power and range.

9. The arrangement of claim 8, wherein the hand-held transmitter includes a transmitting key, which when operated continuously, causes the hand-held transmitter to emit contiguous output signals, wherein the output signals for controlling the locking devices comprise a leading code section of limited time duration, and the output signals for controlling the drives comprise a subsequent maintenance section, and further including switching means for automatically switching the output power of the hand-held transmitter from the first output power to the second output power once the code section has been emitted.

* * * * *